(12) United States Patent
Yaffe

(10) Patent No.: US 8,428,931 B2
(45) Date of Patent: Apr. 23, 2013

(54) MAINFRAME DATA STREAM PROXY AND METHOD FOR CACHING COMMUNICATION BETWEEN EMULATORS AND MAINFRAMES

(75) Inventor: Lior Yaffe, Hadera (IL)

(73) Assignee: Software AG, Darmstadt (DE)

( * ) Notice: Subject to any disclaimer, the term of this patent is extended or adjusted under 35 U.S.C. 154(b) by 328 days.

(21) Appl. No.: 12/656,369

(22) Filed: Jan. 27, 2010

(65) Prior Publication Data
US 2011/0172986 A1 Jul. 14, 2011

(30) Foreign Application Priority Data
Jan. 13, 2010 (EP) .................. 10150639

(51) Int. Cl.
*G06F 17/50* (2006.01)
*G06F 9/44* (2006.01)
*G06F 13/10* (2006.01)
*G06F 9/455* (2006.01)
*G06G 7/62* (2006.01)

(52) U.S. Cl.
USPC ............ 703/26; 703/17; 703/20; 703/21; 703/23

(58) Field of Classification Search ........... 703/17, 703/20, 21, 23, 26
See application file for complete search history.

(56) References Cited

U.S. PATENT DOCUMENTS

| | | | |
|---|---|---|---|
| 6,061,714 A | 5/2000 | Housel, III et al. | |
| 6,185,617 B1 | 2/2001 | Housel, III et al. | |
| 6,332,163 B1 * | 12/2001 | Bowman-Amuah | 709/231 |
| 6,427,132 B1 * | 7/2002 | Bowman-Amuah | 703/22 |
| 6,442,748 B1 * | 8/2002 | Bowman-Amuah | 717/108 |
| 6,473,794 B1 * | 10/2002 | Guheen et al. | 709/223 |
| 6,515,968 B1 * | 2/2003 | Combar et al. | 370/252 |
| 6,615,166 B1 * | 9/2003 | Guheen et al. | 703/27 |
| 6,615,253 B1 * | 9/2003 | Bowman-Amuah | 709/219 |
| 6,823,452 B1 * | 11/2004 | Doyle et al. | 713/156 |
| 7,047,394 B1 * | 5/2006 | Van Dyke et al. | 712/209 |
| 7,209,874 B2 * | 4/2007 | Salmonsen | 703/23 |
| 7,246,146 B1 * | 7/2007 | Ims et al. | 709/203 |
| 7,426,642 B2 * | 9/2008 | Aupperle et al. | 713/185 |
| 7,562,124 B2 * | 7/2009 | Mathewson, II | 709/210 |

(Continued)

FOREIGN PATENT DOCUMENTS
EP 0 877 320 11/1998

OTHER PUBLICATIONS

Housel et al. "Emulator Express: A System for Optimizing Emulator Performance for Wireless Networks", IBM Systems Journal, vol. 39, No. 2, 2000.*

(Continued)

*Primary Examiner* — Shambhavi Patel
(74) *Attorney, Agent, or Firm* — Nixon & Vanderhye PC (57) ABSTRACT

The present invention concerns a mainframe data stream proxy (MDSP) (1) for caching communication of at least one emulator (2) directed to at least one mainframe (3), wherein the MDSP (1) comprises:
a. a runtime application server (10), adapted for receiving (101, 201) at least one emulator action from the at least one emulator (2) and for sending (105, 209) at least one corresponding mainframe action to the at least one emulator (2);
b. wherein the runtime application server (10) is further adapted for retrieving (102, 103) the at least one corresponding mainframe action to be sent to the at least one emulator (2) from a cache (20) of the MDSP (1).

18 Claims, 6 Drawing Sheets

U.S. PATENT DOCUMENTS

| | | | |
|---|---|---|---|
| 7,634,540 B2 * | 12/2009 | Ivashin et al. | 709/204 |
| 7,644,171 B2 * | 1/2010 | Sturniolo et al. | 709/230 |
| 7,761,404 B2 * | 7/2010 | Chen et al. | 1/1 |
| 7,848,913 B2 * | 12/2010 | Salmonsen | 703/23 |
| 7,904,914 B2 * | 3/2011 | Green et al. | 719/321 |
| 8,006,098 B2 * | 8/2011 | Aupperle et al. | 713/185 |
| 2002/0133810 A1 | 9/2002 | Giles et al. | |
| 2003/0191623 A1 * | 10/2003 | Salmonsen | 703/24 |
| 2003/0220781 A1 * | 11/2003 | Salmonsen et al. | 703/25 |
| 2006/0046819 A1 * | 3/2006 | Nguyen et al. | 463/16 |
| 2006/0253894 A1 * | 11/2006 | Bookman et al. | 726/2 |
| 2008/0225871 A1 | 9/2008 | Paskett et al. | |
| 2008/0263640 A1 * | 10/2008 | Brown | 726/5 |

OTHER PUBLICATIONS

"Ajax and Web Services Integrated Framework Based on Duplicate Proxy Pattern", Gan et al., College of Computer Science, Beijing University of Technology, China, 1981.

"Design Patterns Elements of Reusable Object-Oriented Software Passage" XP002200550, 1995.

"Distributed Proxy: A Design Pattern for Distributed Object Communication", Silva et al., INESC/IST Technical University of Lisbon, XP002237007, pp. 1-8.

* cited by examiner

MAINFRAME DATA STREAM PROXY AND METHOD FOR CACHING COMMUNICATION BETWEEN EMULATORS AND MAINFRAMES

This application claims priority to European Application No. 10150639.2 filed, 13 Jan. 2010, the entire contents of which is hereby incorporated by reference.

1. TECHNICAL FIELD

The present invention relates to a mainframe data stream proxy and a method for caching communication between emulators and mainframes.

2. THE PRIOR ART

Organizations oftentimes use applications running on legacy systems, such as mainframes that have been in place for a long time and serve for driving mission-critical computations. Mainframes typically communicate with one or more terminal emulators, wherein the terminal emulators serve for displaying screens of the legacy mainframe application and for allowing users to input data into data fields of the screens. The user input is then transmitted back to the mainframe, which responds by transmitting the next screen to the terminal emulator. In summary, a session of a user with a legacy mainframe system can thus be regarded as a sequence of displayed screens connected by user inputs. Examples of mainframe hardware and their corresponding operating systems are IBM AS/400, z/OS, OS/400, VSE, VM, BS2000, UNIX or Unisys, which typically communicate with terminal emulators such as VT100 terminals or IBM's 5250 and 3270 terminals over TELNET-based protocols, such as TN3270, TN5250, BS2000, Fujitsu, Hitachi and Tandem protocols.

However, adapting such legacy mainframe systems and their applications to changing needs of an organization is extremely difficult. For example, the source code of the legacy application (e.g. programmed in COBOL) may no longer be available, so that any adaptation of the functionality of the legacy application is impossible. Because of the closed nature of mainframe hardware, software and operating systems, hardware and software for mainframes are much more expensive as compared to personal computers, commodity hardware, and Windows or Unix based systems, although in some cases mainframes are only maintained as archives for historical data for read-only usage.

In order to increase the efficiency of using such mainframes without adapting the mainframe (which is typically impossible), it is known in the prior art to optimize the data streams communicated between the mainframe and the connected terminal emulators. For example, the product ULTRAOPT is a 3270 data stream optimization product available from BMC Software (cf. e.g. http://documents.bmc.com/products/documents/26/71/22671/22671.pdf).
ULTRAOPT is typically installed on the mainframe system itself and compresses TN 3270 packets communicated between the mainframe and terminal emulators in order to reduce the needed network bandwidth. Furthermore, the product IBM Emulator Express (cf. e.g. "Accelerating Telnet Performance in Wireless Networks" of Housel et al. (Proceedings of the ACM International Workshop on Data Engineering for Wireless and Mobile Access, 1999, p. 69-76) and the related U.S. Pat. No. 6,185,617 B1) is a telnet solution designed to reduce network traffic when using 3270 and 5250 protocols. This solution employs a client side intercept located near or on the terminal emulator that compresses outbound data streams and a server side intercept located near or on the mainframe that decompresses inbound data streams. Consequently, the amount of data normally transferred is reduced. However, this solution relies on the proprietary terminal emulator Emulator Express and does not work with 3rd party emulators.

While reducing the amount of data communicated between terminal emulators and mainframes over the network increases the overall efficiency to some extent, a further critical component is the mainframe itself. Due to the closed nature and the oftentimes outdated software and/or hardware of mainframes that is not well suited for handling requests in modern application scenarios, the mainframes typically represent a major bottleneck for the overall efficiency.

It is therefore the technical problem underlying the present invention to provide methods and systems for further increasing the efficiency when using a mainframe and thereby at least partly overcoming the above explained disadvantages of the prior art.

3. SUMMARY OF THE INVENTION

This problem is according to one aspect of the invention solved by a mainframe data stream proxy (MDSP) for caching communication of at least one emulator directed to at least one mainframe. In the embodiment of claim 1, the MDSP comprises:
a. a runtime application server, adapted for receiving at least one emulator action from the at least one emulator and for sending at least one corresponding mainframe action to the at least one emulator;
b. wherein the runtime application server is further adapted for retrieving the at least one corresponding mainframe action to be sent to the at least one emulator from a cache of the MDSP.

Accordingly, the embodiment defines a MDSP comprising a runtime application server that is preferably located between at least one emulator and at least one mainframe. The at least one emulator sends emulator actions directed to the at least one mainframe, wherein an emulator action may represent an action performed on a given mainframe screen currently displayed by the emulator, such as the entering of data into the screen or the scrolling through items in a list of a screen. The mainframe is supposed to respond to emulator actions by sending mainframe actions back, wherein a mainframe action may represent a new screen to be displayed on the requesting emulator.

Instead of simply compressing the data packets communicated between the emulator(s) and mainframe(s), the runtime application server of the above embodiment receives the at least one emulator action from the at least one emulator and sends the at least one corresponding mainframe action back to the at least one emulator, wherein the corresponding mainframe action is retrieved from a cache of the MDSP. Therefore, the at least one emulator action is in this embodiment not transmitted to the at least one mainframe, but the request represented by the emulator action is handled by the MDSP itself, therefore off-loading the processing of the emulator action from the mainframe. This aspect has the advantage that processing time is saved at the mainframe and may thus be used in other ways, e.g. for processing emulator actions that are not handled by the MDSP. Furthermore, since the MDSP and its components may be implemented on more modern and affordable hardware, such as commodity PC hardware, the efficiency involved in processing emulator actions is considerably increased. In case all mainframe actions normally provided by the mainframe are comprised in the cache of the MDSP (e.g. if the mainframe is used only for reading a historical data archive), the mainframe can even be completely replaced by the MDSP, which allows considerable cost savings with respect to the involved hardware. In summary, the MDSP according to the above embodiment reduces the load on the at least one mainframe, improves the response times for the at least one emulator (and the terminal emulator users) and may even completely replace a mainframe which is preferably only used as a data archive.

In a further aspect of the present invention, the runtime application server may be further adapted for determining whether the cache already comprises the at least one mainframe action corresponding to the at least one received emulator action based on an identifier of a screen currently displayed on the at least one emulator, at least one AID key, a focus location and/or data of at least one field extracted from the at least one received emulator action, wherein the at least one emulator action corresponds to a screen currently displayed by the at least one emulator. Accordingly, the MDSP may be able to parse the received emulator actions in order to extract the information embedded therein and decide if the cache already comprises a suitable mainframe action based on the extracted and identified information. In other words, the MDSP may be able to "understand" the mainframe application and may track the state of the emulator session logic (i.e. the mainframe screen currently displayed by the emulator). Therefore, instead of just caching or compressing existing data streams, the MDSP may also eliminate, reorder or inject new mainframe screens and actions into emulator actions and/or mainframe actions according to the processing logic of the mainframe application. Further aspects and examples of this semantic understanding of the mainframe and emulator logic by the MDSP will be described in the detailed description below.

In another aspect, the application server may be further adapted for sending the at least one received emulator action to the at least one mainframe, for receiving the Corresponding mainframe action from the at least one mainframe and for storing the at least one corresponding mainframe action in the cache. Accordingly, in case the MDSP determines that there is no suitable mainframe action comprised in the cache for handling a given emulator action, the MDSP may pass the emulator action to the mainframe. After receiving a response from the mainframe (the corresponding mainframe action), the response is stored in the cache of the MDSP, so that future emulator actions can be handled by the MDSP instead of the mainframe. In other words, the MDSP may at runtime "learn" the mainframe actions sent by the mainframe and the corresponding emulator actions and may update and/or extend its cache accordingly.

Additionally or alternatively, the application server may be further adapted for storing the at least one received emulator action in a synchronization path of the MDSP. Accordingly, the synchronization path may be viewed as a log of emulator actions (e.g. a hashtable) and their corresponding mainframe actions received by the MDSP over time. Moreover, the application server may be further adapted for sending the at least one emulator action stored in the synchronization path to the at least one mainframe to support synchronization of the at least one mainframe with the at least one emulator. This is an important capability of the MDSP to ensure a correct processing of emulator actions. In case the MDSP has already served a particular emulator action from its cache and has thus sent a corresponding mainframe action back to the emulator, the emulator is in a particular "state" represented by the screen of the last mainframe action it has received. On the other hand, the mainframe may not have noticed this state change of the emulator (since the emulator action was not sent to the mainframe but handled by the MDSP) and may therefore be in another "state". If now the emulator sends a further emulator action (from its current "state") for which the MDSP does not have a corresponding mainframe action in its cache, the mainframe may not be able to handle this emulator action, because it is in the incorrect state. To this end, the MDSP may send the emulator actions stored in its synchronization path sequentially to the mainframe in order to put the mainframe into the same, i.e. synchronized state with the emulator. Afterwards, the further emulator action may be sent to the mainframe for processing.

Moreover, the runtime application server may be further adapted for optimizing the synchronization path by removing at least one emulator action from the synchronization path that does not modify data and/or application state on the at least one mainframe. This aspect serves for optimizing the synchronization of the mainframe with the emulator, so that the mainframe has only to perform a minimal amount of emulator actions before reaching a synchronized state, as will be further explained in the detailed description below. Additionally or alternatively, the runtime application server may be further adapted for optimizing the synchronization path by replacing a sub-path of the synchronization path with another sub-path based on at least one predefined rule. Accordingly, certain sub-paths (i.e. sequences of emulator actions) may be replaced in the synchronization path by other, preferably shorter or otherwise more optimal, sub-paths. Such "short-cuts" may be defined at design time, as will be shown further below.

Preferably, the MDSP is located on a computer distinct from the at least one emulator and/or the at least one mainframe. Accordingly, no adaptation of either the mainframe(s) or the emulator(s) may be required in the context of the present invention.

In yet another aspect the runtime application server may be further adapted for determining whether a received mainframe action should be stored in the cache based on an identification of the structure of a screen comprised in the received mainframe action. Accordingly, the MDSP may be able to "understand" the mainframe actions provided by the mainframe, which allows for a much more efficient and intelligent caching, as will be further explained in the detailed description below.

The present invention also relates to a method for caching communication of at least one emulator directed to at least one mainframe in accordance with claim 10. In this embodiment the method comprises the steps of receiving at least one emulator action from the at least one emulator at a mainframe data stream proxy (MDSP), sending at least one corresponding mainframe action from the MDSP to the at least one emulator and retrieving the at least one corresponding mainframe action to be sent to the at least one emulator from a cache of the MDSP. Further advantageous modifications of embodiments of the method of the invention are defined in further dependent claims. Lastly, the present invention provides a computer program comprising instructions for implementing any of the above methods.

4. SHORT DESCRIPTION OF THE DRAWINGS

In the following detailed description, presently preferred embodiments of the invention are further described with reference to the following figures.

5. DETAILED DESCRIPTION

Figure 1:
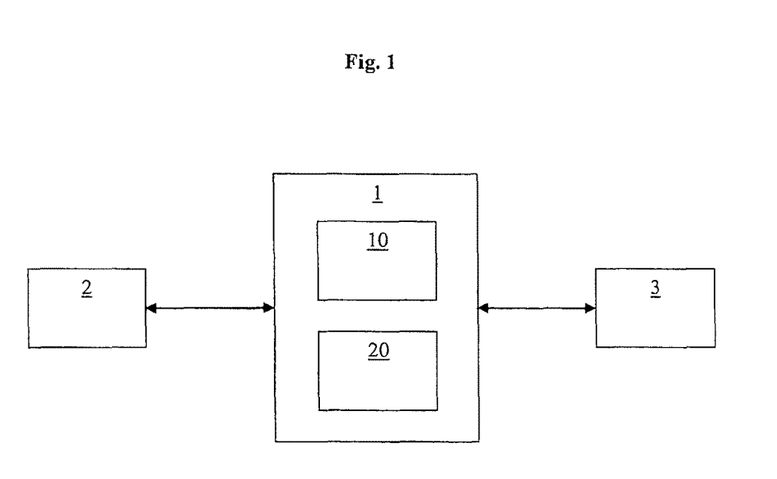
FIG. 1: A block diagram showing a mainframe data stream proxy according to an embodiment of the present invention.

In the following, a presently preferred embodiment of the invention is described with respect to a mainframe data stream proxy (MDSP) 1 as schematically shown in FIG. 1. As can be seen, the MDSP 1 is located on a communication connection, such as a network connection, between an emulator 2 and a mainframe 3. Communication between the emulator 2 and the mainframe 3 is typically based on a negotiation phase, host screen information sent from the mainframe 3 to the emulator 2 and AID key(s), field data and/or focus location sent from the emulator 2 to the mainframe 3. Each emulator action sent to the mainframe 3 may trigger complex processings on the mainframe machine, such as running Cobol code and querying or updating a database. It will be appreciated that FIG. 1 only shows an extremely simplified scenario and that the MDSP 1 may connect a plurality of emulators 2 and/or mainframes 3.

The MDSP 1 of FIG. 1 comprises a runtime application server 10 that acts as a proxy between the emulator 2 and the mainframe 3. As will be explained in more detail in the following, the runtime application server 10 comprises, among others, runtime logic to monitor data streams (representing emulator actions and mainframe actions), to identify screens and actions (which were preferably defined during design time) and/or to invoke defined triggers that process the data streams. In some embodiments, the runtime application server 10 may further handle aspects such as encryption, security and scalability.

In some embodiments, the MDSP 1 may comprise further design time entities, such as a graphical user interface (GUI) (not depicted in FIG. 1) for defining screens, emulator actions, triggers and/or mappings between them. The GUI may also serve for configuring a caching behavior of the MDSP 1.

One advantage of the MDSP 1 over known protocol-level caching and/or compression solutions is that the MDSP 1 is able to "understand" the mainframe application and may track the state of the emulator session business logic. Therefore, instead of just caching and/or compressing existing data streams, the MDSP 1 may also eliminate, reorder and/or inject new mainframe screens and/or actions according to the business logic of the mainframe application. The MDSP behavior and policies may be defined during design time by identifying and parsing the existing mainframe screens. An MDSP cache application may be designed per mainframe application based on specific working procedures and concurrency requirements for the specific application. The MDSP cache application designer may decide which screens are allowed to be cached and design how to identify the cached screens and the actions leading to these screens. By doing so, the designer is able to define much stronger and flexible caching rules as compared to generic caching mechanisms. As a result, the MDSP 1 can considerably optimize repetitive processes and off-load the processing from the mainframe without impacting the emulator user experience. In one embodiment, the MDSP 1 relies on the ApplinX designer of applicant for capturing and identifying mainframe screens and for defining fields on existing screens.

ApplinX is a product designed to modernize mainframe applications by exposing them as web applications or web services. ApplinX comprises an emulation layer that communicates with the mainframe and a presentation layer which transforms the mainframe screens into web pages or transactions.

Exemplary Cache 20 Implementation

As can be seen in FIG. 1, the MDSP 1 comprises a cache 20 that serves for caching the communication between the emulator 2 and the mainframe 3. To this end, the cache 20 may comprise at least one cache entry, wherein each cache entry may comprise an action key (relating to a corresponding received emulator action) and an action value (relating to a mainframe action corresponding to the emulator action). The following code listing shows an exemplary data structure of a cache entry:

```
Cache entry {
    Action Key object {
        Current State:
            Screen object - of the current Screen presented by the
                emulator
        Action Data:
            Fields Data:
                Field 1 name: Field 1 value, Position on screen
                Field 2 name: Field 2 value, Position on screen
                ...
                Field n name: Field n value, Position on screen
            Focus location: Position on screen
            AID Key: AID key identifier
    }
    Action Value object {
        screen object - of the expected Mainframe screen
        isBack - identified if this action cancels the previous
            action
        time stamp
    }
}
Screen object {
    screen id
    screen telnet packet
    Data structure used for screen structure comparison
    Data structure used for screen data comparison
    CRC
}
```

Accordingly, the MDSP 1 of the present invention may parse the emulator actions and/or mainframe actions received from the emulator 2 and/or mainframe 3, respectively, and build the cache 20 in such a manner that its cache entries comprise the above information extracted from the emulator actions and/or mainframe actions.

Runtime Processing

At runtime, embodiments of the MDSP 1 and/or its runtime application server 10 may perform all or at least part of the following processing steps, which will be described with respect to FIGS. 2 and 3:

The MDSP 1 may monitor the state of the current session of the emulator 2, comprising the current screen displayed at the emulator 2 and/or previous actions of the current emulator session.

When the MDSP 1 (more precisely its runtime application server 10) receives an emulator action from the emulator 2 (cf. step 101 in FIG. 2 and step 201 in FIG. 3), the MDSP 1 may transform the received emulator action into an "action key" (preferably according to the action key object data structure listed above) and search (step 102 in FIG. 2 and step 202 in FIG. 3) for this action key in the cache 20. In case the action key exists in the cache 20 (a situation called "cache hit" in the following), the corresponding action value object will be retrieved from the cache 20 (step 103 in FIG. 2). As can be seen above, the action value object preferably comprises a screen object representing the mainframe action to be returned to the emulator 2, wherein the screen object preferably comprises a host screen image represented as a telnet packet. The retrieved mainframe action is then returned to the emulator 2 (step 105 in FIG. 2). It is important to note that in this case, the MDSP 1 will not pass the emulator action to the mainframe 3, thereby off-loading the screen processing from the mainframe 3.

Figure 2:
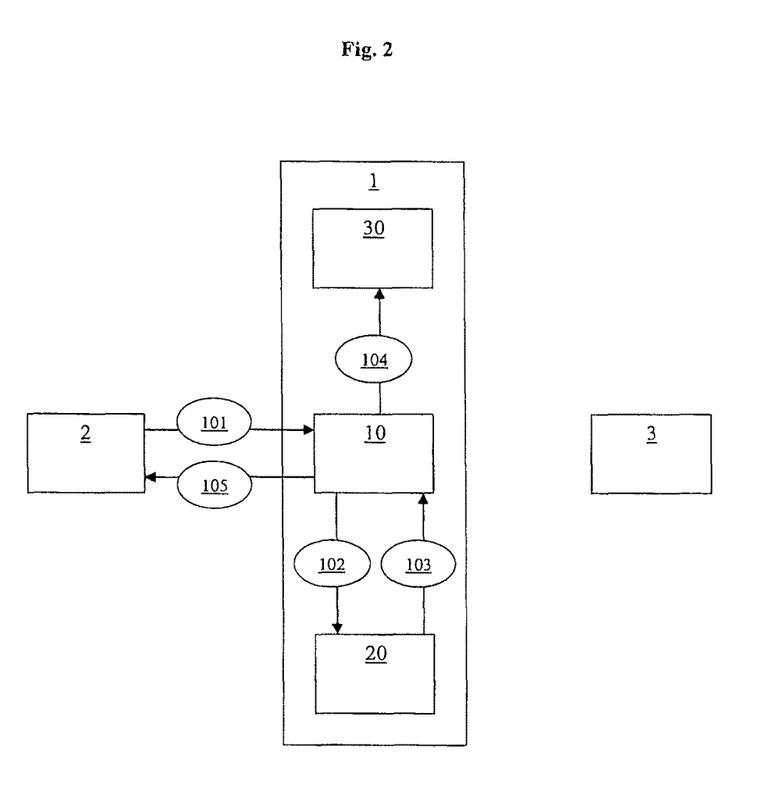
FIG. 2: A block diagram showing a mainframe data stream proxy and method involving a cache hit according to an embodiment of the present invention.
Figure 3:
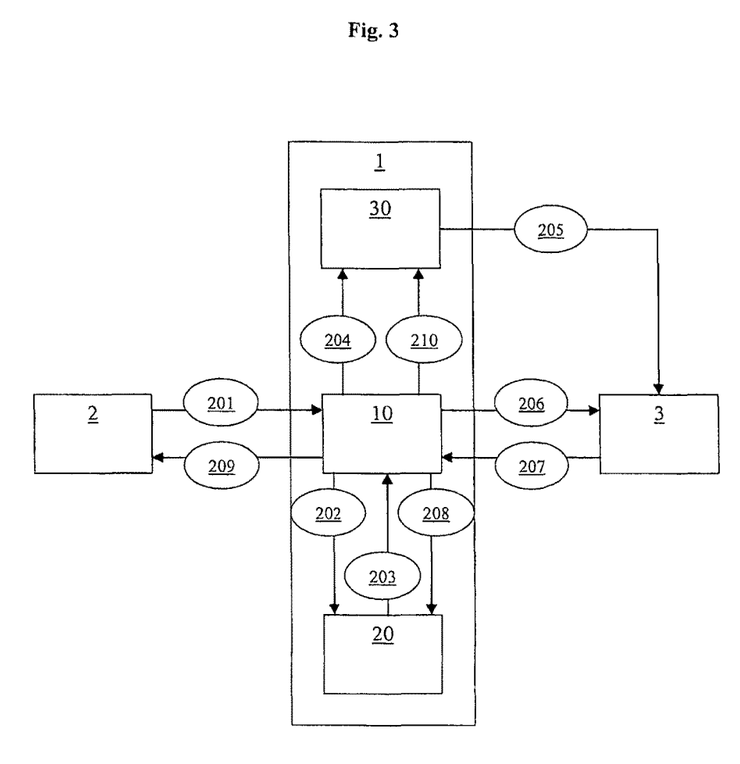
FIG. 3: A block diagram showing a mainframe data stream proxy and method involving a cache miss according to an embodiment of the present invention.

In step 4 of FIG. 2, the MDSP 1 saves a synchronization path 30, which can be used at any time to navigate the mainframe 3 to the cached screen which the emulator 2 currently shows and thus to synchronize the mainframe 3 and the emulator 2 to the same state.

If the MDSP 1 is unable to match an action key object in its cache 20, i.e. if the cache 20 does not already comprise a mainframe action corresponding to the emulator action (a situation called "cache miss" in the following), the cache 20 will return an indication of such a cache miss to the runtime application server 10 (step 203 in FIG. 3). The MDSP 1 then sends the actions comprised in the synchronization path 30 to the mainframe 3 (step 205 in FIG. 3) to synchronize the mainframe 3 with the current screen displayed by the emulator 2. Afterwards, the MDSP 1 sends the action data received from the emulator 2 to the mainframe 3 (step 206 in FIG. 3). The MDSP 1 may then wait until it receives (step 207 in FIG. 3) the next mainframe action (screen) and may update the action key and/or the response host screen image in the cache 20. Additionally or alternatively, the MDSP 1 may furthermore clear the synchronization path 30 (i.e. remove its entries) after it was played back to the mainframe 3 in case of a cache miss (cf. step 210 in FIG. 3).

During a cache miss, when synchronizing the mainframe 3 to the screen currently presented by the emulator 2, the MDSP 1 may perform path optimization on the synchronization path 30 in order to eliminate redundant actions and/or actions which cancel each other, such as a Page Down AID key followed by a Page Up AID key.

In cases where the mainframe 3 cannot be synchronized with the emulator 2 after executing the synchronization path 30, i.e. in an error condition, the MDSP 1 may identify this error condition by comparing static areas of the current mainframe screen to the screen shown by the emulator 2. The MDSP 1 may then synchronize the emulator 2 to the screen shown by the mainframe 3. In this case, the MDSP 1 may inject data into the mainframe screen in order to hint the emulator 2 that it has been synchronized unexpectedly.

The MDSP 1 may identify "back" actions sent from the emulator 2 such as exiting a screen using the "cancel" AID key and may pop, i.e. remove, the last emulator action from the synchronization path 30, compose a mainframe action from its current state and send the composed mainframe action back to the emulator 2, thereby returning the emulator 2 to its previous screen (state) without contacting the mainframe 3.

The MDSP 1 may identify "lookup window" operations on the mainframe 3, such as pressing a certain AID key (e.g. the F4 key in an AS400 application) in order to open a lookup window. The MDSP 1 may cache the data presented on the lookup window and once the emulator user selects a value from the lookup window, the MDSP 1 may pop the last screen from the synchronization path 30 and inject the value selected in the popup window to the current screen presented by the emulator 2. The MDSP 1 may also force the screen to be considered modified by the emulator 2, so that the injected information will be part of the next emulator action.

The MDSP 1 may identify "bypass" actions, so that a given mainframe screen can be reached using a less costly navigation than the one requested by the emulator 2. For example, the MDSP 1 may identify a request for viewing invoice details from an invoice lookup table and may instead send actions to the mainframe 3 to view the same invoice by typing the invoice number from a different screen, thus avoiding a costly table lookup.

Caching Policies

As already explained further above, the MDSP 1 may support different caching policies that may be selected during design time when assembling an MDSP application. Exemplary caching policies are global cache (all sessions of different emulators 2 use the same cache), session group cache (sessions are assigned to groups, each group shares its own cache. A group may be identified by a group identifier specified on one of the mainframe screens or e.g. by using a device name pool), user cache (caching is performed at the user level, i.e. individually for each emulator 2. This is a special case of "Session group cache", where the group identifier is the username field taken from the mainframe sign-on screen) and session cache (caching is valid only for the lifetime of a single emulator session and is not shared by other sessions).

Preferably, each mainframe screen identified at design time has its own caching policy, e.g. selected from the following exemplary caching policies: none (the screen content will never be cached. The screen is always sent from the mainframe 3 to the emulator 2 as is) or cacheable (the screen content may be cached using one of the caching policies outlined above).

Cache Building

The present invention provides a variety of options for building the cache 20. One example is using a mainframe crawler, e.g. a remotely controlled emulator session (or sessions in a pool) which can build the cache during off peak hours. A crawler may be invoked using a scheduler such as a cron job or using a trigger based on an emulator action. The path which the crawler follows may be defined during design time. Another option is using a "One for all" policy, wherein each session builds the cache for other sessions in its group during runtime operation of the MDSP 1. Whenever a session identifies a mainframe screen which is cacheable but not yet comprised in the cache 20, an action key object will be created for it and added to the cache 20 shared by other sessions. A third option is using a "Session cache", i.e. each session maintains its own cache 20. In this context, a session is generally referred to as a series of communications between a particular emulator 2 and a particular mainframe 3.

Triggers

As already explained above, the processing by the MDSP 1 may involve one or more triggers, wherein a trigger may be activated by an action (e.g. an emulator action, a mainframe action, or an external action) and/or another trigger. An action may activate zero or more triggers. In a preferred embodiment, the MDSP 1 supports all or at least part of the following triggers:

Cache lookup: for looking up an emulator action key in the cache 2 (see also further below). Preferably triggered by every emulator action received at the MDSP 1.

Cache hit: sends the telnet packet linked to the action key from the cache 20 to the emulator 2. Preferably triggered by a successful cache lookup.

Cache miss: activates the synchronization of the mainframe 3 with the emulator 2 and then forwards the last emulator action to the mainframe 3. Preferably triggered by a failed cache lookup.

Cache update: updates or adds a cache entry to the cache 20 with a key representing an emulator action and a value of the current screen telnet packet. Preferably triggered by a mainframe action which is identified as referring to a cacheable screen.

Cache flush: removes a specific cache entry/item from the cache 20. Preferably triggered by an external action, an update to an existing mainframe screen and/or a cache policy which explicitly request to clean specific action keys from the cache 20.

Push: pushes, i.e. stores, the current screen and/or action key to the synchronization path 30. Preferably triggered by a cache hit.

Pop: pops, i.e. retrieves and removes, the last screen from the synchronization path 30, e.g. to simulate a "cancel" action and sends the screen to the emulator 2. Preferably triggered by a cache hit which is identified as "back" action. The pop trigger may also be able to inject data into the screen popped from the synchronization path 30.

Synchronization: synchronizes the mainframe 3 with the emulator 2, preferably by following the synchronization path 30 and sending the actions in the synchronization path 30 one after another to the mainframe 3.

Synchronization error: injects a hint to the screen sent from the mainframe 3 to the emulator 2 in order to indicate to the emulator 2 that the synchronization failed and/or sends the last mainframe action to the emulator 2. Preferably, triggered at the end of the synchronization trigger, if the screen comparison between the mainframe screen and the screen presented by the emulator 2 does not match.

Emulator update: updates the content of a screen from the MDSP 1 to the emulator 2. Preferably triggered by a mainframe action.

Mainframe update: updates an action key from the MDSP 1 to the mainframe 3. Preferably triggered by a cache miss.

Screen identification: matches a screen from the mainframe 3 with a named screen in the MDSP repository (i.e. in the cache 20). Preferably triggered by a mainframe action.

Screen compare: compares the screen currently presented by the emulator 2 with a screen sent from the mainframe 3. Preferably triggered by the synchronization trigger.

Bypass trigger: the cache 20 may navigate the mainframe 3 to the same destination screen using a less costly navigation. Preferably triggered by a cache miss in case a bypass trigger is defined for the respective emulator action.

Reverse bypass trigger: reverses the bypass trigger before starting the synchronization trigger. Preferably triggered by the synchronization trigger.

In addition or alternatively to the following built-in functionalities of the MDSP 1, the MDSP 1 may be adapted for being configured with at least one MDSP cache application that comprises one more rules defining relationships between the above triggers. Thus, the MDSP 1 may be extended with additional processing logic.

Cache Lookup

The following listing describes steps preferably performed by the runtime application server 10 during the execution of a cache lookup (cf. the cache lookup trigger further above) in order to determine whether the cache 20 already comprises a cache entry with a suitable mainframe action corresponding to the emulator action received by the emulator 2:

1. Create a list of all action keys in the cache 20 that match the current screen id and AID key from the emulator action. Mark the resulting list of action keys as L1.
2. If L1 is empty, return CACHE_MISS
3. Iterate over L1 and for each action key in the list, compare its field data with the field data of the emulator action. If the field data of at least one field does not match, remove the action key from L1.
4. If L1 is empty, return CACHE_MISS
5. If a screen property "compare focus location" is set ("compare focus location" may be a parameter set during design time):
   a. extract the focus location from the emulator action and determine a field boundary rectangle in which the focus is placed. Mark this as "focused field area".
   b. iterate over L1 and compare the focused field area from each action key with the focused field area from the emulator action. If the focused field area does not match, remove the cache entry from L1.
   c. If L1 is empty, return CACHE_MISS
6. If L1 contains exactly one entry, return CACHE_HIT along with the entry (the remaining entry represents the mainframe action corresponding to the original emulator action).
7. Iterate over L1 and perform data comparison on the screen currently presented by the emulator 2 with the screen object stored in the current state field of the action key. Preferably, only fields marked as "comparable" (e.g. during design time) are compared. If there is no match, remove the cache entry from L1.
8. If L1 is empty, return CACHE_MISS
9. If L1 contains exactly one entry, return CACHE_HIT along with the entry.
10. If L1 still contains more than one entry (this should never happen under normal circumstances), return CACHE_HIT along with the entry comprising the latest time stamp.

Path Optimization

As already described further above, one of the advantages of the MDSP 1 is its ability to optimize the synchronization path 30. The optimization of the synchronization path 30 is aimed at reducing the cost of a cache miss. Without optimization, the cost of playing back the synchronization path 30 would in the worst case offset the work saved by caching the previous screens. By implementing path optimization, the synchronization path 30 can be considerably optimized, thereby reducing the cost of a cache miss.

In the following, the synchronization path 30 may be regarded as a directed graph comprising vertices connected by edges, wherein the vertices represent mainframe actions/screens and the edges represent the emulator actions for moving between the mainframe actions/screens.

During design time, the mainframe screens (vertices) and/or the emulator actions for moving between them (edges) may be identified. Each emulator action may be assigned a boolean "side effect" property, which can either be "false" or "true".

An emulator action with side effect "false" characterizes an emulator action as not modifying (e.g. adding, updating or deleting) information from the mainframe 3 and thus does not to affect the mainframe application's internal state (except possibly moving the mainframe 3 to a different screen). Actions without side effects are candidates for optimization, since they do not affect the mainframe state and therefore eliminating them or bypassing them will not cause any side effects on the mainframe application.

For emulator actions which were not identified (preferably during design time), the side effect property may be set to "true". Actions with side effect set to true may not be optimized by the path optimization.

In the following, exemplary path optimization strategies provided by embodiments of the present invention are described:

Read only cycle optimization: This optimization strategy removes cyclic paths from the synchronization path 30 that represent a loop in the graph that has no side effects. i.e. the loop starts and ends at the same mainframe action/screen and all emulator actions in the loop have a side effect property set to "false". As an example, starting from a screen with a table, the emulator user may have pressed the page down and then the page up AID key or a combination of paging keys which eventually cancel each other. As a further example, starting from a menu screen, the emulator user may have entered a screen and then cancelled out without modifying the contents of the screen.

Value lookup optimization: This optimization strategy is an extension of the read only cycle optimization, except that the last emulator action in the loop is allowed to have a side effect. In this scenario, the loop is eliminated from the synchronization path 30 and the side effect of the last emulator action in the loop is injected into the mainframe action/screen that represents the starting point of the loop. As an example, in a "new order" screen, the emulator user may have filled in ordered catalog numbers, opened a lookup table for "catalog numbers", paged in the "catalog numbers" table, selected a catalog number in the table and updated it back to the "new order" screen. In this case, the loop is optimized and the selected catalog number is injected directly into the "new order" screen currently presented by the emulator. In addition, the modified flag of the presented screen is set to "on" to signal the emulator to send the modified field(s) in the next emulator action. This is done without actually opening the "catalog numbers" lookup table on the mainframe 3.

Bypass optimization: In this advanced optimization strategy, (which is preferably defined during design time), the path optimization process identifies a known sub-path between vertices V1, V2, . . . , V(n−1), V(n) that has no side effects. The path optimization then chooses to navigate between vertices V1 and V(n) using a simpler sub-path which has no side effect as well. As an example, starting from the menu screen (V1), the emulator user may open a customer orders screen (V2), page several times in the list of orders (V3, V(n−1)) and then select an order for update to reach the "order update" screen Vn. The path optimization process may in this case choose to bypass screens V2, . . . , V(n−1) using a simpler mainframe navigation which will take the mainframe 3 to V(n) by typing the order number to screen which does not require a table lookup. Such bypass paths can either exist in the original mainframe 3 or can be manually added by mainframe developers to support more efficient caching.

Exemplary Runtime Algorithm of the MDSP 1

The following pseudo code listing depicts an exemplary algorithm performed by an embodiment of the MDSP 1. In this example, it is assumed that a telnet session is already established and the emulator 2 and the mainframe 3 currently display the same screen.

```
Event: Emulator Action - Action Key received from the
   emulator
   Execute "cache lookup" trigger.
   If "Action Key" is found in cache // Cache hit
      Execute "Emulator update" trigger - i.e. send cache
         result back to the emulator
      Set IsSynchronized to "false" to indicate that the
         Emulator and Mainframe are no longer showing the
         same screen.
```

-continued

```
      If action key is back action
         Pop the last screen from the "Synchronization Path"
      Else
         Append current host screen image and Action Key to
         The synchronization path including the screen
            retrieved from the cache.
   Else // Cache Miss
      Perform path optimization on the synchronization path
      Execute "synchronization" trigger to navigate the
         mainframe to the screen displayed by the emulator (using
         the optimized synchronization path).
      Execute "screen compare" trigger comparing the last
         screen in the path with the actual mainframe screen
      If screen compare match
         Send the current emulator action to the mainframe
         When a new mainframe screen arrives, execute screen
         Identification trigger
         If screen is cacheable
            Execute cache update trigger
         EndIF
      Else
         Inject an error signal into the mainframe screen
      EndIf
      Execute emulator update trigger
      Delete the synchronization path
      Set IsSynchronized to True
   EndIf
Event: Mainframe Action - Spontaneous screen received from
   the host
   Execute screen identification trigger
   Execute emulator update trigger
   Set IsSynchronized to True
   Delete the synchronization path
```

Application Scenarios

Print job caching: Print jobs may be cached by the present invention and resubmitted to the emulator 2 without requiring the mainframe 3 to regenerate the print job. This is for example advantageous when the emulator user experiences a printer malfunction and has to resubmit a print job multiple times. Another scenario is that monthly invoice print jobs are generated by the mainframe overnight. The print jobs may be cached by a mainframe crawler and the actual printing of the jobs may be off-loaded from the mainframe 3 during peak hours.

Mainframe replacement mode: In cases where the mainframe 3 is only used as a read-only achieve, it is possible for the MDSP 1 to use e.g. a cache crawler to load all the mainframe data into its cache 20 and to completely eliminate the need to use the mainframe 3. During design time, a mainframe crawler may be designed to visit all possible mainframe screens and actions. Once the mainframe crawler runs to completion, it may cache all the data the mainframe currently stores into a persistent cache 20 and the emulator 2 may no longer need to connect to the mainframe 3.

Further Capabilities of the MDSP

Embodiments of the MDSP 1 may perform the caching based on at least part of the following assumptions:

When the same field data, AID key and/or focus location are sent by the emulator 2 from the same mainframe screen, the corresponding mainframe action/screen sent from the mainframe 3 is likely to contain the same data and therefore can be cached and later retrieved from the cache 20.

In cases when data changes on the mainframe 3, a trigger may be set to identify this situation and to flush or refresh the cache 20.

Emulator actions which need to update the mainframe 3 will never get lost or corrupted by the inventive caching mechanism.

Requests for data from the emulator 2 will receive the most current data collected since the last cache update.

The cache runtime components may cooperate with most existing terminal emulators 2 and will not require infrastructure changes from the end user, preferably neither at the emulator 2, nor at the mainframe 3.

In order for the cache 20 and the MDSP 1 to provide optimal efficiency the mainframe screens should be identified at design time. Unidentified screens should not be cached. The mainframe action for these screens may be sent directly to the emulator 2 after playing back the synchronization path.

If an action key from a non-identified screen is received, it should not be looked up in the cache 20.

During screen identification, the following areas of a screen may be distinguished: static areas of a screen may be used for identification of a given screen and for comparison of screen data, dynamic areas such as output fields which contain key data may be used only for comparison of screen data with screen data from the cache 20, dynamic areas which e.g. which display the date, time, LU Name and/or user name may not be used for comparison with cached screens.

Exemplary Usages

In the following, the usage of an embodiment of the MDSP 1 is explained in the context of two scenarios.

Figure 4A:
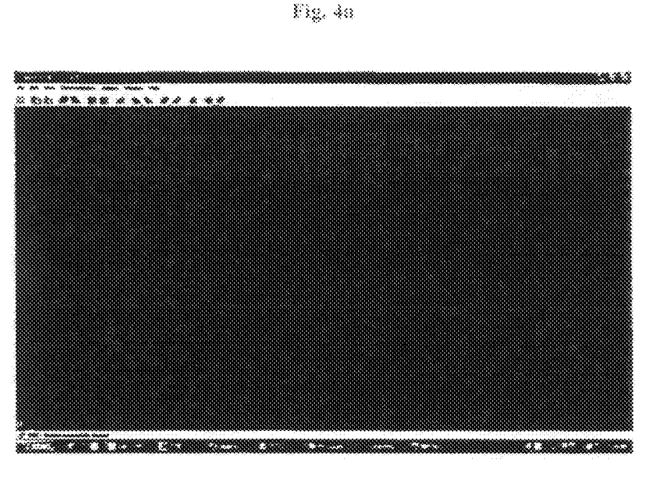
FIGS. 4a-f: Exemplary mainframe screens.

Scenario 1 relates to the usage of the cache 20 and the synchronization path 30. In this scenario, it is assumed that the first two pages of a "Customer Maintenance" table are already cached, i.e. stored in the cache 20. The session starts at the "Sales Menu" screen shown in FIG. 4*a*. At this point in time, the emulator 2 and the mainframe 3 are both on the "Sales Menu" screen, i.e. they are in a synchronized state. On the "Sales Menu" screen of FIG. 4*a* displayed at the emulator 2, the emulator user types "12" into the "Selection" field and presses the ENTER AID key. The MDSP 1 intercepts the resulting emulator action sent by the emulator 2 and matches it to the following action key (preferably based on identification rules defined during design time, e.g. by using the above explained ApplinX product):

---

Current State:
  Screen: "Sales Menu"
  Page: * (the screen has no table)
Action Data:
  Data: "12" in "Selection" field (position 21/014)
  Focus location: *
  AID Key: Enter
  Original Telnet packet

---

The emulator action triggers the cache lookup trigger (see further above), which looks up the action key in the cache 20. Since in this scenario, the selection "12" corresponds to the menu item "Customer Maintenance" in the "Sales Menu" screen of FIG. 4*a* and since the first two pages of the corresponding "Customer Maintenance" table are already cached, the result of the cache lookup is a cache hit: The cache lookup trigger then sends the "Customer Maintenance Page 1" screen depicted in FIG. 4*b* from the cache 20 to the emulator 2, so that the emulator 2 displays the "Customer Maintenance Page 1" screen of FIG. 4*b*. The action data part of the action key is not updated to the mainframe 3, i.e. the mainframe 3 does not receive the emulator action originally sent by the emulator 2. Instead, the mainframe remains on the "Sales Menu" screen of FIG. 4*a*. In addition, the cache lookup trigger stores the action key in the synchronization path 30. The synchronization path will be used later when there is a need to synchronize the mainframe with 3 the emulator 2.

Figure 4B:
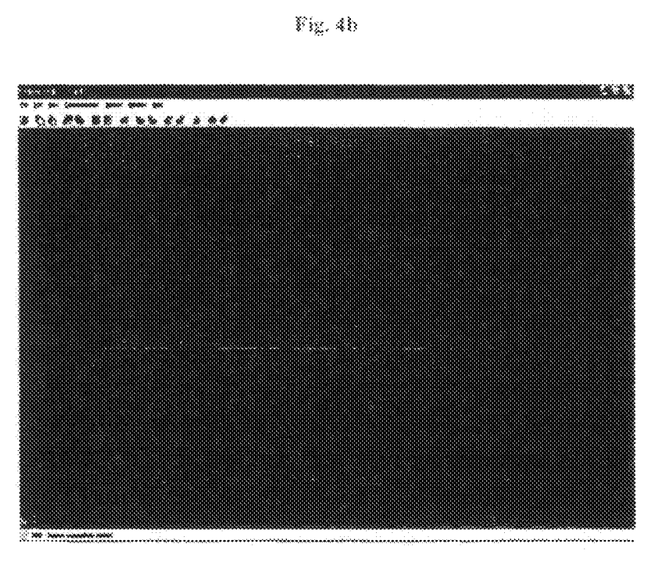

The emulator user now clicks the "Page Down" key on the "Customer Maintenance Page 1" screen of FIG. 4*b* displayed at the emulator 2. When processing the resulting emulator action, the MDSP 1 matches the following action key:

---

Current State:
  Screen: "Customer Maintenance"
  Page: 1
Action Data:
  Data: *
  Focus location: *
  AID Key: Page Down
  Original Telnet packet

---

Figure 4C:
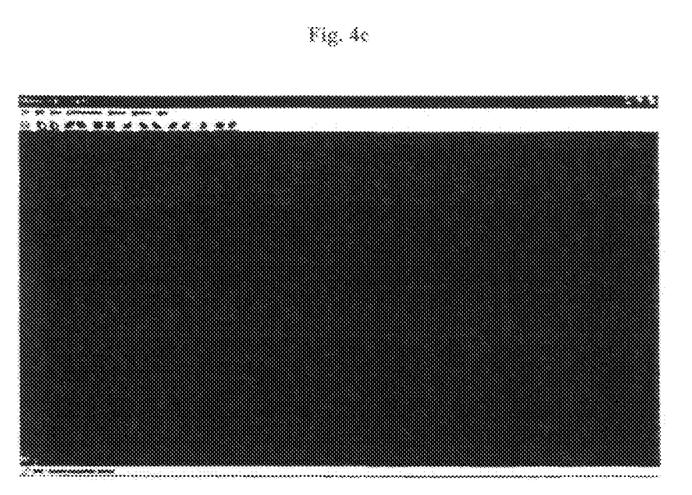

This triggers a cache lookup which again results in a cache hit, and as a result, the 2nd page of the "Customer Maintenance" table depicted in FIG. 4*c* is retrieved from the cache 20 and sent to the emulator 2. Again, the action data is not sent to the mainframe 3 which still remains on the "Sales Menu" screen of FIG. 4*a*. The action key is appended to the synchronization path 30. At this point in time, the emulator 2 displays the screen "Customer Maintenance Page 2" of FIG. 4*c* from the cache 20.

The emulator user now types "3" in the SEL column in the line containing the name "Jackson Bob" i.e. in position 20/003 of the "Customer Maintenance Page 2" screen of FIG. 4*c*. The action key matched by the MDSP 1 is:

---

Current State:
  Screen: "Customer Maintenance"
  Page: 2
Action Data:
  Data: "3" at field "SEL" table row 6
  Focus location: *
  AID Key: Enter
  Original Telnet packet

---

The action will trigger the cache lookup trigger, which in this situation results in a cache miss (note that in this scenario, the screen requested by the emulator action is not comprised yet in the cache 20). The cache miss in turn triggers the synchronization trigger to synchronize the mainframe 3 to the screen currently shown by the emulator 2.

The synchronization trigger sends the actions stored in the synchronization path 30 to the mainframe 3 one by one, preferably using the original telnet packets. After each action, the MDSP 1 may compare the screen received from the mainframe 3 with the cached screen and may update the cache 20. When the mainframe 3 reaches the screen currently displayed by the emulator 2 (in this example the "Customer Maintenance" page 2 of FIG. 4*c*), the MDSP sends the current emulator action key to the mainframe 3 and sends the resulting mainframe action to the emulator 2. At this point in time, the mainframe 3 and the emulator 2 are synchronized again. In addition, the new screen is identified, and if it was marked as "cacheable" during design time, the last emulator action and mainframe action are updated to the cache 20.

However, in this example, only some mainframe resources are saved, since eventually the same actions performed by the emulator user were also performed at the mainframe 3 when playing back the synchronization path 30. To this end, the MDSP 1 may optimize the synchronization path 30. As already described in more detail above, this may be achieved e.g. by path optimization, i.e. by optimizing the synchronization path 30 and eliminating redundant actions, and/or by bypass action(s) in order to reach the same screen using a less "costly" path.

Figure 4D:
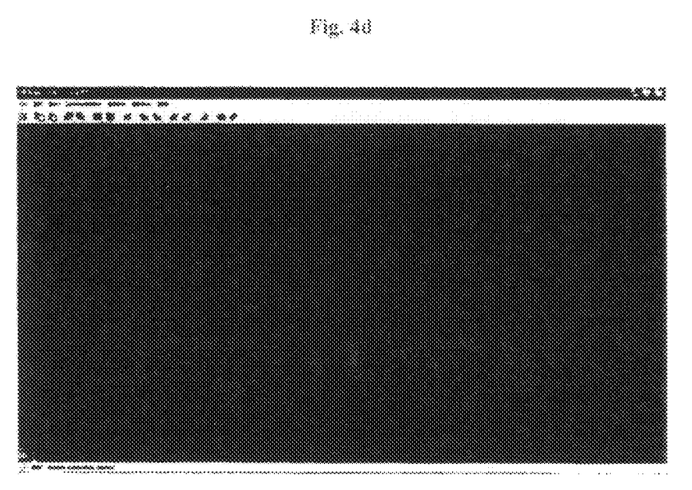

Scenario 2 relates to injecting a response from a table lookup. Here, it is assumed that all pages of a "States" table (a table which lists the US state codes) were already cached, e.g. by a Mainframe crawler which ran overnight, and are thus stored in the cache 20. Since this table is essentially static, there is no need to update it during working hours. Furthermore, it is assumed that an "Update Customer" screen is also cached for injection purposes which will be explained below. The process starts from the "Update Customer" screen shown in FIG. 4d and at this point in time, both the emulator 2 and the mainframe 3 display this screen with customer number "44444445" (cf. FIG. 4d).

The emulator user now updates some fields and then moves the cursor to the "State:" input field and presses "F4" to view the list of states. The lookup key matched by the MDSP 1 is:

```
Current State:
    Screen: "Update Customer"
    Page: * (the screen has no table)
Action Data:
    Data: *
    Focus location: 12/049 or 12/050 (it is also possible to
    define focus location by field if fields are marked on the
    screen during design time)
    AID Key: F04
    Original Telnet packet
```

This results in a cache hit, since the "States" table is already in the cache 20 in this example. The results of the lookup are:
1. The "States" screen (cf. FIG. 4e) is retrieved from the cache 20 and sent to the emulator 2. The action key is not sent to the mainframe 3.
2. The "Update Customer" screen is pushed to the synchronization path 30 together with all the updated data fields sent by the "F4" emulator action. This is because some of the fields on the "Update Customer" screen may already be updated by the user and it must be ensured that these updates are not lost.

Figure 4E:
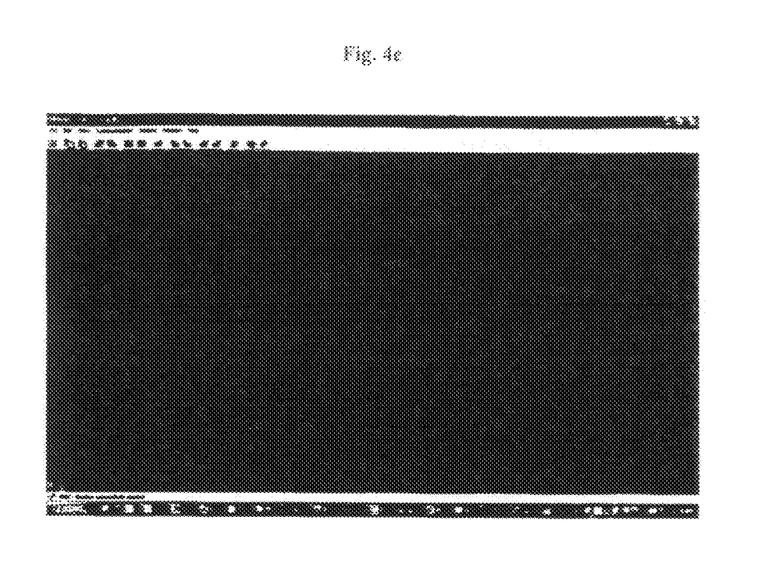

At this point in time, the emulator 2 displays the screen depicted in FIG. 4e. The emulator user now types "1" in the SEL column in the line containing the state code "AL" in position 12/011. The resulting emulator action is:

```
Current State:
    Screen: "States"
    Page: * (the screen has no table)
Action Data:
    Data: "1" at position 12/001
    Focus location: *
    AID Key: Enter
    Original Telnet packet
```

This results in a cache miss, since the resulting "Update Customer" screen is not in the cache 20 for this specific emulator action. However, this lookup key triggers the pop trigger. The pop trigger reads the value from the "State Code" column in row 12 and then invokes the pop with injection trigger. This trigger pops the previous "Update Customer" screen from the synchronization path 30 and then parses the data stream and injects values into the telnet packets, e.g. as follows:
"AL" is injected to the position of the "State:" input field to update the selected value.

All data fields updated on the "Update Customer" screen before pressing "F4" are injected to their corresponding locations in the telnet packet.

Preferably, the focus location packet is injected to the focus location which appeared in the lookup key.

The injected screen is marked as modified, so that the emulator will update all fields back to the mainframe when the next emulator action is issued.

Figure 4F:
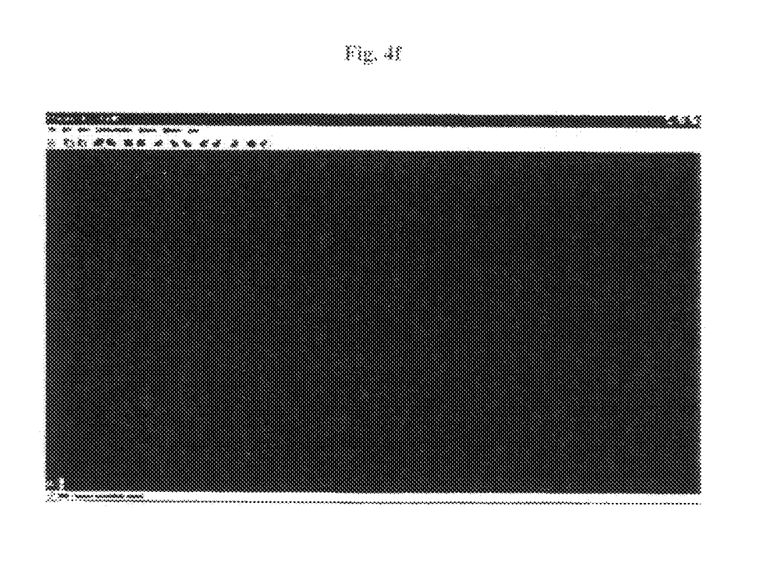

The resulting screen displayed at the emulator 2 is depicted in FIG. 4f. To this end, the "State" value has just been looked up in a lookup table without sending a single communication packet to the mainframe 3.

SUMMARY

In summary, the present invention provides a mainframe data stream proxy (MDSP) preferably comprising development and/or runtime environments for creating caching layers for existing mainframe applications. The MDSP can cache mainframe screens by identifying emulator actions to which it already cached the corresponding mainframe action (e.g. the screen sent in response to a user action on the emulator). This way, the MDSP can off-load work and processing from the mainframe. The MDSP may support various caching policies. The MDSP may also identify actions which require synchronization of the emulator session with the mainframe.

GLOSSARY

Mainframe: a machine communicating with terminal emulators using e.g. the 3270/5250/VT/BS2000/Fujitsu/Hitachi/Tandem protocols, which are telnet based protocols.

Emulator: a software component that can communicate with a mainframe, e.g. over telnet.

MDSP (Mainframe data stream proxy): a middle layer between the emulator and mainframe which offloads work from the mainframe.

MDSP application: An MDSP application may comprise a collection of screens, actions and/or caching policies, preferably defined during design time, for a specific mainframe application. MDSP Applications may be deployed to the MDSP 1 runtime components as a single deployment unit.

Screen: A screen may represent a single mainframe screen (e.g. full screen or popup), e.g. captured using an emulator session or built from a screen definition format. A screen may be identified using a set of identifiers that uniquely identify the screen. Screen data may be divided into fields and lists. A list may be further divided into column fields. The MDSP 1 may rely on the ApplinX designer for capturing and identifying mainframe screens and for defining fields on existing screens.

Emulator action: An emulator action may represent a single emulator action performed on a given mainframe screen which is currently presented by the emulator 2. Multiple actions may be defined for a single mainframe screen. An action may be composed of a combination of screen data, cursor position and/or AID key(s). Some actions may be associated with reverse actions that restore the application to its previous state. Emulator actions are typically triggered by an emulator user pressing an AID key, such as Enter, Page Down, Page Up, or a function key.

Mainframe action: a mainframe action may represent a new packet of data sent by the mainframe. A mainframe action typically represents a new screen, but may also represent an error message on an existing screen and/or various other protocol messages. Mainframe actions are typically responses to emulator actions, but in some cases may also be spontaneous mainframe actions where the mainframe 3 sends an action unrelated to any specific emulator action.

External action: an external action may represent an event from an external system indicating that mainframe data has been updated. Typically, this indicates that some entries (e.g. action keys) in the cache 20 of the MDSP 1 need to be refreshed. For example, when a non-mainframe application updates the mainframe directly, it may also invoke e.g. a web service to notify the MDSP 1 to clear the mainframe screens which present this data from the cache 20.

Trigger: a trigger is a script invoked by the MDSP 1 as a result of an action (e.g. an emulator action, mainframe action or external action). A single action may invoke multiple triggers.

The invention claimed is:

1. A computer system, comprising;
    at least one emulator;
    at least one mainframe; and
    a mainframe data stream proxy (MDSP) for caching communication of the at least one emulator directed to the at least one mainframe, wherein the MDSP comprises:
        a runtime application server configured to receive at least one emulator action from the at least one emulator and to send at least one corresponding mainframe action to the at least one emulator;
        wherein the runtime application server is further configured to retrieve the at least one corresponding mainframe action to be sent to the at least one emulator from a cache of the MDSP;
        wherein the application server is further configured to store the at least one received emulator action in a synchronization path of the MDSP,
        wherein the application server is further configured to send the at least one emulator action stored in the synchronization path to the at least one mainframe to support synchronization of the at least one mainframe with the at least one emulator, and
        wherein the application server is further configured to send emulator actions stored in the synchronization path to the at least one mainframe until the at least one mainframe is put into a state expected by the at least one emulator.

2. The system of claim 1, wherein the runtime application server is further configured to determine whether the cache already comprises the at least one mainframe action corresponding to the at least one received emulator action based on an identifier of a screen, at least one AID key, a focus location and/or data of at least one field extracted from the at least one received emulator action, wherein the at least one emulator action corresponds to a screen currently displayed by the at least one emulator.

3. The system of claim 1, wherein the application server is further configured to send the at least one received emulator action to the at least one mainframe, to receive the corresponding mainframe action from the at least one mainframe, and to store the at least one corresponding mainframe action in the cache.

4. The system of claim 1, wherein the runtime application server is further configured to optimize the synchronization path by removing at least one emulator action from the synchronization path that does not modify data and/or application state on the at least one mainframe.

5. The system of claim 1, wherein the runtime application server is further configured to optimize the synchronization path by replacing a sub-path of the synchronization path with another sub-path based on at least one predefined rule.

6. The system of claim 1, wherein the MDSP is located on a computer distinct from the at least one emulator and/or the at least one mainframe.

7. The system of claim 1, wherein the runtime application server is further configured to determine whether a received mainframe action should be stored in the cache based on an identification of the structure of a screen comprised in the received mainframe action.

8. A method for caching communication of at least one emulator directed to at least one mainframe, the method comprising:
    receiving at least one emulator action from the at least one emulator at a mainframe data stream proxy (MDSP) and sending at least one corresponding mainframe action from the MDSP to the at least one emulator;
    retrieving the at least one corresponding mainframe action to be sent to the at least one emulator from a cache of the MDSP;
    storing the at least one received emulator action in a synchronization path of the MDSP;
    sending the at least one emulator action stored in the synchronization path to the at least one mainframe to support synchronization of the at least one mainframe with the at least one emulator; and
    sequentially sending emulator actions stored in the synchronization path to the at least one mainframe until the at least one mainframe is put into a state expected by the at least one emulator.

9. The method of claim 8, further comprising determining whether the cache already comprises the at least one mainframe action corresponding to the at least one received emulator action based on an identifier of a screen, at least one AID key, a focus location and/or data of at least one field extracted from the at least one received emulator action, wherein the at least one emulator action corresponds to a screen currently displayed by the at least one emulator.

10. The method of claim 8, further comprising sending the at least one received emulator action from the MDSP to the at least one mainframe, receiving the corresponding mainframe action from the at least one mainframe at the MDSP and storing the at least one corresponding mainframe action in the cache.

11. A non-transitory computer readable storage medium storing a computer program comprising instructions that, when executed, implement the method of claim 8.

12. The method of claim 8, further comprising optimizing the synchronization path by removing at least one emulator action from the synchronization path that does not modify data and/or application state on the at least one mainframe.

13. The method of claim 8, further comprising optimizing the synchronization path by replacing a sub-path of the synchronization path with another sub-path based on at least one predefined rule.

14. The method of claim 8, wherein the MDSP is located on a computer distinct from the at least one emulator and/or the at least one mainframe.

15. The method of claim 8, further comprising determining whether a received mainframe action should be stored in the cache based on an identification of the structure of a screen comprised in the received mainframe action.

16. The system of claim 1, wherein the synchronization path includes a log of emulator actions and corresponding mainframe actions received by the MDSP over time.

17. The system of claim 1, wherein each said emulator action represents an action to be performed on a mainframe screen currently displayed by a requesting emulator.

18. The system of claim 17, wherein each said mainframe action represents a new screen to be displayed on the requesting emulator.

* * * * *